Figure 1:
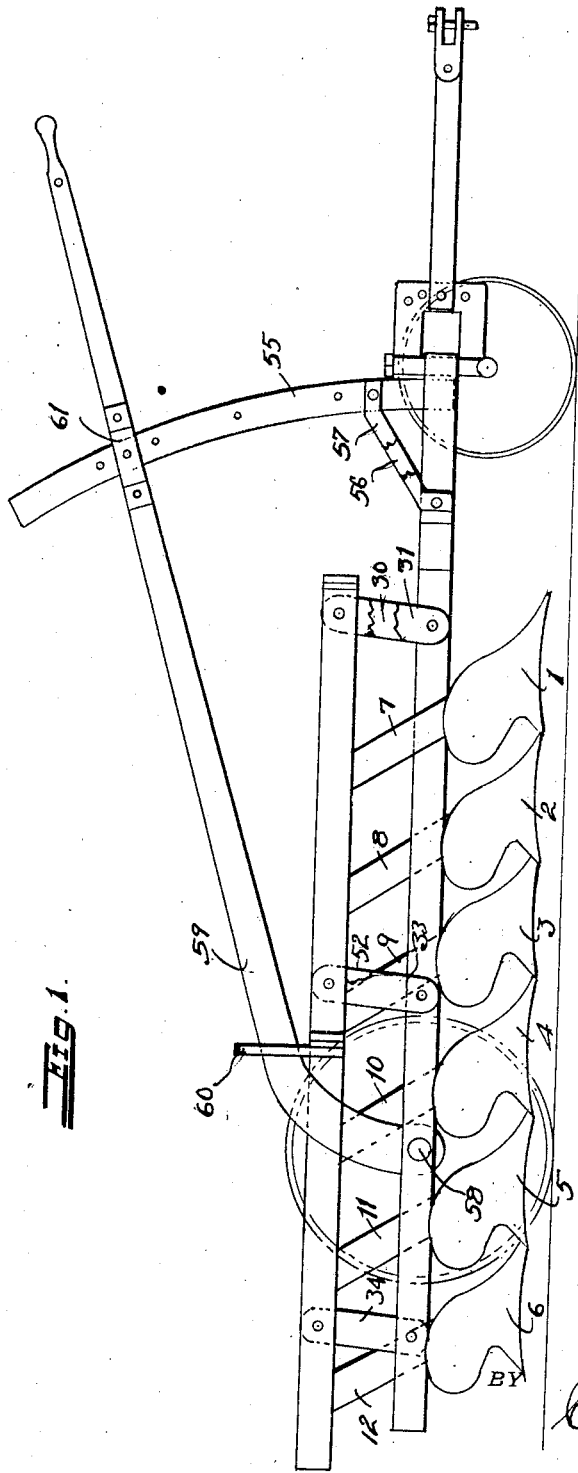

Oct. 29, 1929. E. J. KLEPPE 1,733,737
SOD PLOW
Filed April 11, 1927 4 Sheets-Sheet 1

INVENTOR.
E. J. Kleppe.
BY Carlos P. Griffin
ATTORNEY.

Oct. 29, 1929.  E. J. KLEPPE  1,733,737
SOD PLOW
Filed April 11, 1927  4 Sheets-Sheet 2

Fig. 2.

INVENTOR.
E. J. Kleppe.
BY
Carlos P. Griffin
ATTORNEY.

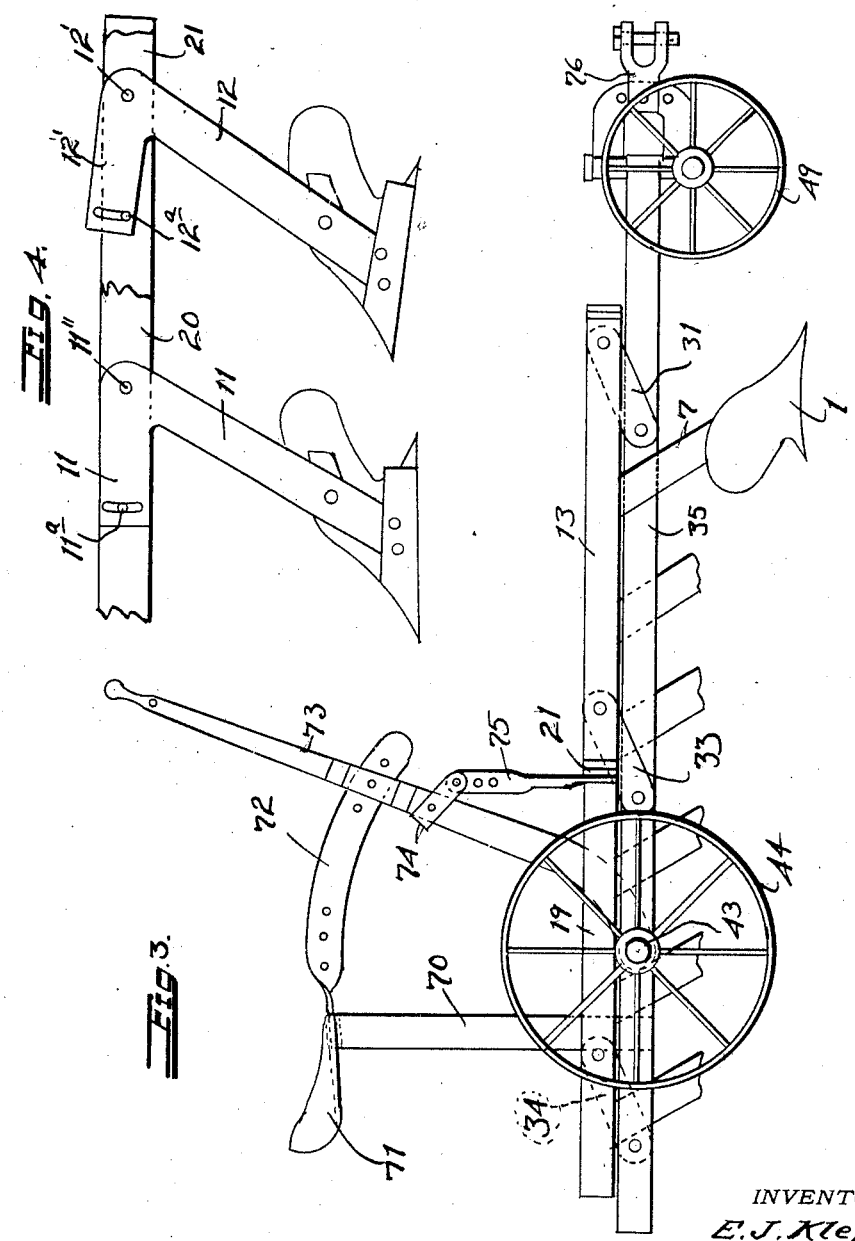

Oct. 29, 1929.   E. J. KLEPPE   1,733,737
SOD PLOW
Filed April 11, 1927   4 Sheets-Sheet 4
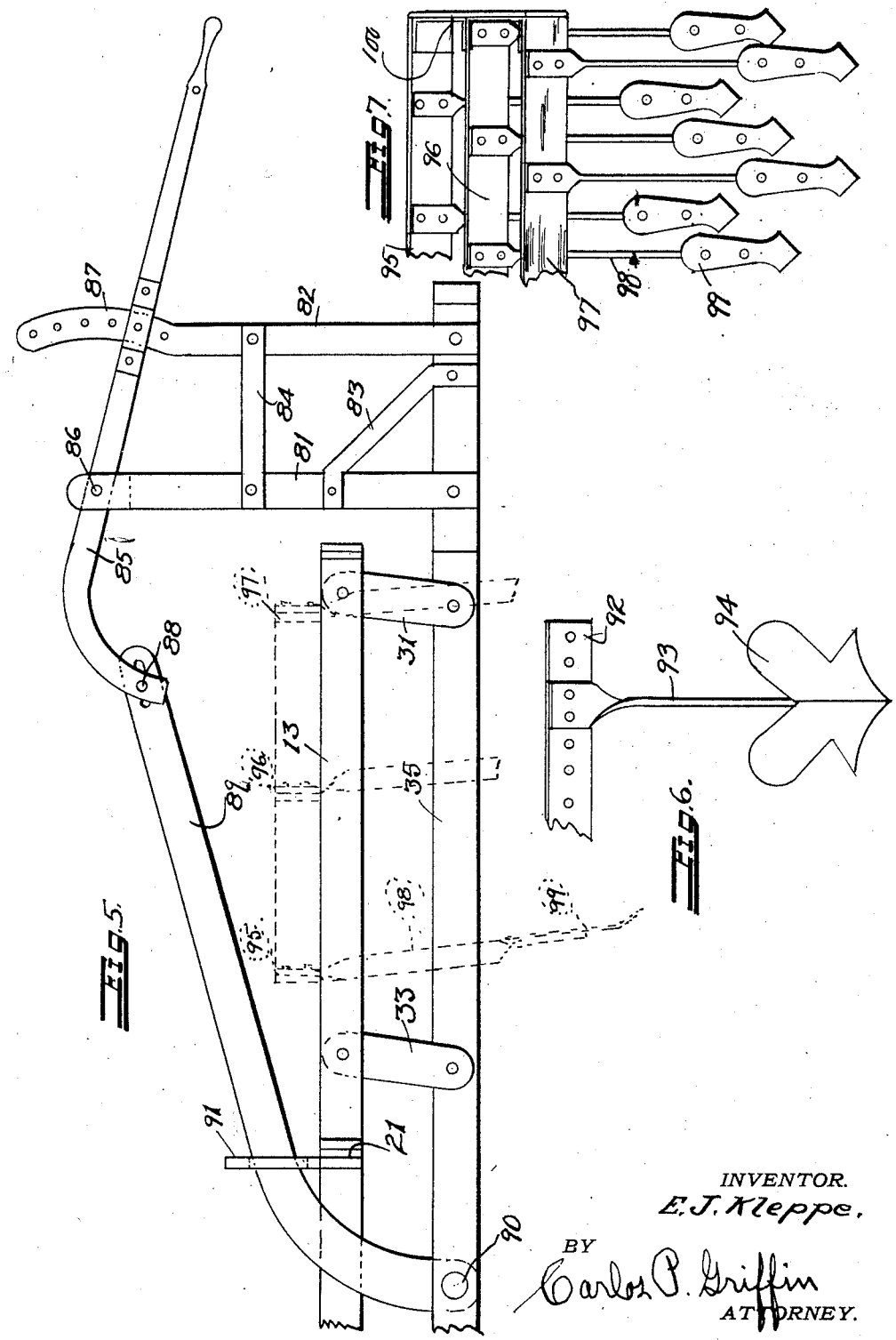
INVENTOR.
E. J. Kleppe,
BY
Carlos P. Griffin
ATTORNEY.

Patented Oct. 29, 1929

1,733,737

UNITED STATES PATENT OFFICE

ERNEST J. KLEPPE, OF RENO, NEVADA

SOD PLOW

Application filed April 11, 1927. Serial No. 182,680.

This invention relates to a sod plow, and its object is to produce a gang plow for cutting sod which will enable the sod to be trimmed very closely, not more than an inch or two over the entire ground to be plowed so that the ground can be broken up and worked the same season that it is first cut.

It will be understood by those familiar with the breaking of sodded land, that where a plow sufficiently strong and heavy to cut the entire sod to the depth of the roots is used, that the resultant sod is very hard to do anything with, and it requires a season or two in the open before it is possible to break the sod up so that a crop can be raised on the plowed ground, but with the present plow a series of small plows are used and a heavy frame is used, which frame can be held at a given elevation so that the plows will throw out their entire furrow cut only about an inch and a half or two inches deep, and thereby give a sod which can be quite readily broken by disking or other harrowing operations.

Another object of the invention is to provide a support for the series of gang plows which will be raised as nearly parallel with the surface of the ground as possible, and thereby will not cause the plows to dig in on the point or to ride on the heel owing to being raised or lowered in a horizontal as to the cutting edge of the plow shares.

In the present plow the plows are rigidly secured to an upper frame, and the wheels are secured to a lower frame. A suitably heavy lever is then used to vary the distance between these two frames, which frames are connected by a series of heavy links, and in this way the plow carrying frame is raised and lowered practically from one horizontal plane to another horizontal plane with the result that the plows can be held very accurately at a given depth, the wheels and upper frame determining the depth of furrow for each plow.

It is to be noted that while this particular frame is intended to support the plows of the ordinary gang type, although usually a very much smaller plow in order to cut the sod into small pieces, that the frame can equally well be used to carry a plurality of cultivator cutters as well as the ordinary plow, and this is contemplated in the present instance.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of the plow frame with two of the rear wheels removed for purpose of illustration, showing the plows just out of the ground, Figure 2 is a plan view of the complete machine with the plows left off for the purpose of illustration.

Figure 3 is a side elevation of the complete machine showing one form of operating lever, Figure 4 is a view of one of the upper beams of the frame showing the plows attached thereto and illustrating the means for the adjustment for the position of the plows as they are operated in turning a furrow, Figure 5 is a side elevation of a plow frame with a still further modified form of operating lever for raising and lowering the plow frames, the lever being extended to provide for the operation of the plow from the seat of the tractor which pulls the plow, the cultivator frame being shown in dotted lines, Figure 6 is a front elevation of one form of cultivator plow that is used with this frame when the ordinary cutting plow shown in Figure 1 is not used, and Figure 7 is a still further modified form of cultivator tooth used in connection with the plow.

The plows are somewhat smaller than those ordinarily used on gang plows, but are substantially similar to the ordinary share and mold board plow there being six of them in the present case, indicated by the numerals 1 to 6 inclusive. Each plow is carried by a depending post, as indicated at 7 to 12, each of which posts is secured to its corresponding horizontal beam as shown in plan view in Figure 2, there being six beams to correspond with the plows, as indicated at 13 to 18 inclusive. The front and rear ends of these beams are bent at an angle to the beams as indicated at 19 and 20 on each beam, and the several beams are then bolted to the two cross bars 21 and 22, which form a rectangular frame for the support of all of the plows.

In order to provide for the sufficient separation of the plows longitudinally with respect to each other, the back end of the upper frame consists of three members 19, 20 and 21. The latter member being bolted alongside the member 18 with the bolt 22, 23 and 24 and having its rear end bent around to form the member 20, and then bent laterally as indicated at 25 to be bolted to the plate 21. The plate 19 has one portion bent laterally and then bent to lie parallel to the plate 20 as indicated at 26, and the front end of the plate 19 is bent laterally as indicated at 27 to be bolted to the back of the plate 21.

The upper frame is pivotally connected to five short links 30 to 34 inclusive, which links are also pivotally connected to the lower frame. The lower frame consists of two members 35 and 36, which are bent toward each other at the front end as indicated at 37, 38 and then the two ends are bolted together as indicated at 39 Figure 2 to form a bar to which is connected the draw bar 40 for connecting the plow frame to the tractor. The draw bar 40 has a clevis 41 at its front end to receive the pin for connecting it to the tractor. At the rear end there is a cross bar 42 which has its ends bent at right angles to the main part of the bar and bolted to the rear ends of the bars 35 and 36.

The main frame of the plow is supported by the axle 43 at the rear end, and the wheels 44 and 45, while at the front end it is supported by the axle 46 which turns on the vertical caster pin 47. The front axle is in turn supported by the wheels 48, 49. Connected to the front end of the lower frame is a curved bar 55, which is held in its proper place by means of the braces 56 and 57 which are extended to both sides of the members 39.

Pivotally connected at 58 to the lower frame is a long operating lever 59 which lever is passed through a yoke 60, and which has a retaining plate 61 to hold it engaged with the curved plate 55, the object being to enable the plow frames to be raised or lowered at will.

In order to provide for holding the two frames of the plow in any given adjustment, the pin 62 is provided, which pin passes through a hole in the lever 59 and through various holes of the curved supporting plate 55. This pin is pivotally connected to an arm 63 which in turn is a part of the arm 64 pivotally mounted on the side of the lever 55. The arm 64 is in turn pivotally connected to a rod 65 which is pivotally connected to the handle 66 pivotally mounted on the front end of the lever 59 as indicated at 67. A spring 68 holds the pin 62 normally in the opening of the plate 55 to which it has been connected.

The result of this construction is that it places the operating lever within reach of the man who is usually mounted on the rear end of the tractor.

From the foregoing description it will be seen that the plows are lifted straight up and straight down without a change in the lower frame distance from the ground, and as the frame itself is made of heavy steel bars the entire structure of the plow is so heavy that it is very easy to keep the plows cutting the precise depth required without cutting too deep and without running over the top of the sod.

In order to provide against danger of breakage the post which carries each individual plow as indicated in Figure 4 is provided with a forwardly projecting extension 12'—11' in each instance, and these posts are pivotally mounted on suitably heavy bolts, as indicated at 11"—12", while another bolt 11ª and 12ª connects the forward ends of the members 11'—12' with the plow beams 21 and 20 respectively. The result of this construction is that the plow posts are held in their usual position merely by friction, and if there is too heavy a load brought to bear upon the plow the result will be that the plow will either break off one of the bolts, or slip to such an extent as to permit the obstruction to be passed without danger of injuring the plow post or the plow structure seriously.

Where the plow is to be pulled by a team of horses the form of adjusting mechanism shown in Figure 3 is used. In this figure the post 70 provides a support for a seat 71 from the front end of which a plate 72 extends. This plate has a series of holes to receive a pin passed through the lever 73, said lever being connected to the axle 43 at its lower end and passing through a stirrup 74 on an upwardly extending post 75 connected to the transverse frame member 21. In this plow the remaining part of the frame is substantially the same as the frame shown in Figures 1 and 2 and carries the same numerals except that at the front end there is a very short clevis 76 for connecting the plow frame to the apparatus for allowing horse pullage of the plow.

At the front of the lower frame there are two posts 81, 82 one of which is provided with a brace 83, and both of which are connected together by means of the plate 84. A lever 85 is pivotally connected to the top of the post 81 and 86, and it moves along the curved top 87 of the post 82, a suitable pin being used to secure it in any one of several different adjustments. At the rear end the lever 85 is pivotally connected by means of a pin 88 to the front end of the main plow frame adjusting lever 89, said lever being connected to the lower frame at 90 and passing slidably through the yoke 91 which is suitably bolted to the transverse bar 21 of the top plow frame.

While this plow is intended for a particular type of heavy sod plowing, it is possible to use it purely as a cultivator and when so used all of the plows are removed therefrom and a frame shown in Figure 7 which carries a plurality of cultivator teeth is substituted in the place of the plows. This frame is merely laid across the top of the top frame and bolted thereto. This frame consists of a series of cross bars 92 to each of which the depending posts 93 and cultivator shuttles 94 are secured. The relation of several of these bars to the other bars of the set is illustrated in Figure 7 in which there are three of the cross bars 95, 96 and 97 with a plurality of the depending posts 98 and cultivator shovels 99 secured thereto, all of the bars being connected together by an end bar 100 at each end. Any suitable bolts may be used for securing this frame to the top frame 13.

Having thus described my invention, what I desire to secure by Letters Patent of the United States is as follows, but modifications may be made in carrying out the invention as shown in the drawings and in the above particularly described form thereof, within the purview of the annexed claim.

A sod plow of the class described comprising a rectangular frame, wheels connected with said frame at the rear to hold it at a fixed position from the ground, castor wheels at the front of said frame to support it, a plow frame above the wheeled frame, links for connecting the plow frame to the wheeled frame and to allow it to be raised by backward tilting or lowered by forward tilting always parallel to the wheeled frame, a series of plows connected to the plow frame, and extending below the wheeled frame, a lever pivotally connected to the rear axle, a yoke connected to the plow frame, and with which the said lever is slidably connected to raise or lower the plow frame, and means to hold said lever in any one of a plurality of adjustments as may be desired.

In testimony whereof I have hereunto set my hand this 22nd day of March, A. D. 1927.

ERNEST J. KLEPPE.